United States Patent Office 3,386,881
Patented June 4, 1968

3,386,881
CHLORINATED HYDROCARBON INSECTICIDES SYNERGIZED WITH ALIPHATIC AMINES
Walter W. Abramitis, Downers Grove, Ill., assignor, by mesne assignments, to Armour Industrial Chemical Company, a corporation of Delaware
No Drawing. Filed Oct. 22, 1965, Ser. No. 502,296
5 Claims. (Cl. 167—22)

ABSTRACT OF THE DISCLOSURE

A synergistic insecticide combination of a chlorinated hydrocarbon insecticide and 5 to 10 parts by weight per part insecticide of an amine.

---

This invention relates to insecticidal compositions and more particularly to compositions comprising a chlorinated hydrocarbon and related insecticides and an aliphatic mono- or polyamine. Such composition, as compared to the chlorinated insecticide alone, provides a synergistic toxic effect which is most desirable.

The use of certain primary and secondary amines as insecticidal agents is known and discussed in some detail in Oil and Soap Reporter, volume 18, pages 11 to 13 (1941), and Journal of the Economic Entomology, volume 34, pages 462 to 466, (1941). Specific amines, such as tertiary diacylamines for insecticidal use, have been made the subject of patents; see, for example, U.S. 2,462,835 and U.S. 2,545,283. Mixtures of amines, such as the mono- di-, and trihexadecylamines, have also been suggested; see U.S. 2,160,058. Even more recently certain diphenylamines have been suggested as useful for killing insecticide resistant flies if they are mixed with DDT and methoxychlor; see Chimie and Industrie, volume 69, pages 658 to 666, (1953).

Unfortunately, this knowledge in or suggestions for insecticidal improvement have left much to be desired. The insecticide or the adjuvant is frequently expensive or malodorous or toxic to humans or leaves and undesirable residue. The use of DDT or methoxychlor or some of the other insecticides, such as dieldrin, aldsin, endrin, heptachlor, toxaphene, persists mostly because they are the most effective for the least cost.

An object of this invention is to provide novel insecticidal compositions.

A further object is to provide a more effective insecticidal composition.

A still further object is to provide a more economical insecticide.

Another object is to provide an insecticidal composition which is soluble in the usual solvents.

Another object is to provide a method for synergizing known insecticides.

Other objects of the invention will in part be obvious and will in part appear hereinafter.

It has now been found that the addition of aliphatic amines and diamines to a chlorinated hydrocarbon insecticide results in a most desirable synergism of the insecticide. More particularly, it has been found that a composition comprising a chlorinated hydrocarbon insecticide, such as DDT, methoxychlor, dieldrin, aldrin, endrin, heptachlor and the like and an amine selected from the group consisting of a primary, secondary, and tertiary aliphatic amines, N-aliphatic trimethylene diamines and alkoxylated derivatives thereof, each said amine having at least one hydrocarbon radical of from 8 to 22 carbon atoms, has a unique synergistic insecticidal activity. Such synergism makes it possible to more effectively kill insecticides or else use less of the insecticide for the same amount of kill.

The invention accordingly comprises the several steps and the relation of one or more of such steps with respect to each of the others thereof, and a composition of matter possessing the characteristics, properties, and the relation of matter possessing the characteristics, properties, and the relation of constituents, which will be exemplified in the process and composition hereinafter disclosed, and the scope of the invention will be indicated in the claims.

Reference is now made to specific examples which illustrate the invention in detail.

EXAMPLE I

Using dieldrin-resistant Colorado potato beetle larvae, application is made topically using 5 mg. of dieldrin per larvae and combinations of dieldrin plus the amine additive indicated in the ratio of 1:20. The amine additives alone are applied at the rate of 10 mg. per larvae. The results are as follows:

Table I

| Composition: | Percent mortality |
|---|---|
| Dieldrin | 10.0 |
| Oleyl primary amine | 3.3 |
| Dieldrin+oleyl primary amine | 20.0 |
| N-oleyl dimethyl tertiary amine | 0.0 |
| Dieldrin+N-oleyl dimethyl tertiary amine | 43.3 |

EXAMPLE II

Five amine additives are tested as adjuvants for DDT against the stable fly. The mixture (about two quarts) is sprayed onto cattle at a concentration of 8 lbs. of 50% wettable powder per 100 gal. of water. Then the routine spot-test technique is used to evaluate the mixture. This test involves confining test insects on the treated animal and noting the mortality of insects periodically. To provide the most drastic conditions, new adult stable flies are used each day.

The data obtainable is given in Table II. In order that the residual effectiveness can be more closely compared, the data are presented as percent mortality on successive days after treatment rather than the usual spot-test classifications normally compiled.

Table II

| Adjuvant | Percent Mortality at Indicated Days After Treatment | | | | | |
|---|---|---|---|---|---|---|
| | 1 | 2 | 3 | 4 | 7 | 8 |
| N-oleyldimethyl tertiary amine | 100 | 100 | 100 | 96 | 54 | 72 |
| Oleylamine | 100 | 100 | 100 | 100 | 38 | |
| Oleylamine plus 40% mineral oil | 100 | 84 | 84 | 87 | 32 | 69 |
| Ethoxylated (15 moles) tallow amine | 100 | 100 | 100 | 100 | 100 | 96 |
| None | 100 | 72 | 65 | 83 | 12 | 16 |

Examples III and IV

Oleylamine plus 40% mineral oil is added to toxaphene and DDT and tested against boll weevils at a concentration of 10 mg./Hg of body weight. Tables III and IV tabulate the results:

Table III.—Tallahassee resistant strain (from the greenhouse)

| Toxaphene, Percent | Oleylamine, Percent | DDT, Percent | Percent Mortality |
|---|---|---|---|
| | 10 | | 23 |
| | 20 | | 10 |
| | 40 | | 10 |
| | 80 | | 53 |
| 10 | 30 | 10 | 100 |
| | 80 | 10 | 100 |
| | | 10 | 23.3 |
| | 10 | 10 | 33.0 |
| | 20 | 10 | 60.0 |
| | 40 | 10 | 63 |
| 10 | | 20 | 65 |

Table IV.—Tallahassee resistant weevils (field collected)

| Toxaphene, Percent | Oleylamine, Percent | DDT, Percent | Percent Mortality |
|---|---|---|---|
|  |  | 20 | 32 |
| 10 |  |  | 12 |
| 10 |  | 20 | 37 |
| 5 | 5 | 20 | 52 |
| 10 | 10 | 20 | 70 |
| 20 | 20 | 20 | 97.5 |
| 20 |  | 20 | 67 |
| 10 | 30 | 20 | 100 |
| 10 |  | 10 | 52 |
| 5 | 5 | 10 | 45 |
| 10 | 10 | 10 | 45 |
| 10 | 30 | 10 | 97.5 |
| 40 |  |  | 32.5 |
|  |  | 20 | 32.0 |

It should be evident from the above that amines of the type specified act as synergists or activators for chlorinated hydrocarbon insecticides. When an amine is used, a substantial improvement, better than the additive effect of the amine and the chlorinated hydrocarbon alone, is effected.

The amines which can be employed include the following:

(1) Primary, secondary, or tertiary aliphatic amines having at least one hydrocarbon radical of from 8 to 22 carbon atoms.
(2) N-aliphatic trimethylene diamines having at least one hydrocarbon radical of from 8 to 22 carbon atoms.
(3) Alkoxylated (ethoxylated or propoxylated) derivatives of the above amines and diamines.

The chlorinated hydrocarbon insecticides which can be employed include the following:

(1) DDT (dichlorodiphenyltrichloroethane).
(2) Dieldrin (hexachloroepoxyoctahydro - endo, exodimethanonaphthalene).
(3) Aldrin (hexachlorohexahydro - endo, exodimethanonaphthalene).
(4) Endrin (heptachloro - epoxy - octahydro - endo-endodimethanonaphthalene).
(5) Heptachlor (heptachloro - 4,7 - methanotetra - hydroindene).
(6) Chlordane (octachloro - 4,7 - methanotetra - hydroindane).
(7) Toxaphene (chlorinated camphene having a chlorine content of 67 to 69%).
(8) Methoxychlor (2,2 - bis(paramethoxyphenyl) - 1,1,1-trichloroethane).

Usually, the insecticide is applied as a solution, although an emulsion or a powder spray may be used. For solution, solvents such as xylene, acetone (ethyl, isopropyl, and the like) chlorinated solvents (carbon tetrachloride and the like) are useful.

Generally, 5 to 10 parts by weight of the amine per part of insecticide may be used to obtain the synergistic result.

The resultant composition (insecticide plus amine) is used in the same or customary amounts the insecticide above would be; that is, the composition of the invention is used as a substitute for the insecticide alone.

It will thus be seen that the objects set forth above, among those made apparent from the preceding description, are efficiently attained, and since certain changes may be made in carrying out the above process and the above composition of matter without departing from the scope of the invention, it is intended that all matter contained in the above description shall be interpreted as illustrative and not in a limiting sense.

What is claimed is:

1. An insecticidal composition consisting essentially of a chlorinated hydrocarbon insecticide selected from the group consisting of dichlorodiphenyl-trichloroethane; hexachloroepoxyoctahydro endo, exodimethanonaphthalene; hexachloro - hexahydro - endo, exodimethanonaphthalene; heptachloro - epoxy - octahydro - endo - endodimethanonaphthalene; heptachloro - 4,7 - methanotetra - hydroindene; octachloro - 4,7 - methanotetra - hydroindane; chlorinated camphene; and 2,2-bis(paramethoxy-phenyl)-1,1,1 trichloroethane and about 5 to 10 parts by weight per part insecticide of an amine selected from the group consisting of primary, secondary, and tertiary aliphatic amines, N-aliphatic trimethylene diamines and alkoxylated derivatives thereof, each said amine having at least one hydrocarbon radical of from 8 to 22 carbon atoms.

2. An insecticidal composition consisting essentially of hexachloroepoxyoctahydro - endo, exodimethanonaphthalene and 5 to 10 parts by weight per part hexachloroepoxyoctahydro-endo, exodimethanonaphthalene of oleyl primary amine.

3. An insecticidal composition consisting essentially of hexachloroepoxyoctahydro - endo, exodimethanonaphthalene and 5 to 10 parts by weight per part hexachloroepoxyoctahydro-endo, exodimethanonaphthalene of N-oleyldimethyl tertiary amine.

4. An insecticidal composition consisting essentially of dichlorodiphenyltrichloroethane and 5 to 10 parts by weight per part dichlorodiphenyltrichloroethane of oleyl primary amine.

5. An insecticidal composition consisting essentially of hexachloroepoxyoctahydro - endo, exodimethanonaphthalene and 5 to 10 parts by weight per part hexachloroepoxyoctahydro-endo, exodimethanonaphthalene of ethoxylated tallow amine.

References Cited

UNITED STATES PATENTS

| | | | |
|---|---|---|---|
| 2,204,511 | 6/1940 | Ralston et al. | 167—22 |
| 2,267,204 | 12/1941 | Kyrides | 167—22 |
| 2,302,388 | 11/1942 | Hester | 167—22 |
| 2,323,658 | 7/1943 | Hester | 167—22 |
| 2,383,564 | 8/1945 | Ralston et al. | 167—22 |
| 2,430,288 | 11/1947 | Flenner | 167—30 |
| 2,430,576 | 11/1947 | Littler | 167—42 |
| 2,523,177 | 9/1950 | Yowell et al. | 167—22 |
| 2,841,521 | 7/1958 | Abramitis | 167—22 |
| 2,868,688 | 1/1959 | Benesi et al. | 167—42 |
| 3,139,376 | 6/1964 | Gilbert | 167—22 |

LEWIS GOTTS, *Primary Examiner.*

S. K. ROSE, *Assistant Examiner.*